United States Patent
Kumble et al.

(10) Patent No.: US 11,263,037 B2
(45) Date of Patent: Mar. 1, 2022

(54) VIRTUAL MACHINE DEPLOYMENT

(71) Applicant: International Business Machines Corporation, Armonk, NY (US)

(72) Inventors: Ramesh Kumble, Ashburn, VA (US); Pramod Belsare, Pune (IN); Satish Lodam, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 16/541,808

(22) Filed: Aug. 15, 2019

(65) Prior Publication Data
US 2021/0049029 A1     Feb. 18, 2021

(51) Int. Cl.
*G06F 9/455*     (2018.01)

(52) U.S. Cl.
CPC .. *G06F 9/45558* (2013.01); *G06F 2009/4557* (2013.01)

(58) Field of Classification Search
CPC ............... G06F 9/45558; G06F 2009/4557
See application file for complete search history.

(56) References Cited

U.S. PATENT DOCUMENTS

| | | |
|---|---|---|
| 2007/0271560 A1 | 11/2007 | Wahlert |
| 2014/0181816 A1 | 6/2014 | Muller |
| 2015/0154056 A1 | 6/2015 | Chen |
| 2015/0205542 A1* | 7/2015 | Antony ............. G06F 9/45558 711/162 |
| 2017/0031699 A1* | 2/2017 | Banerjee ............. G06F 12/0895 |
| 2017/0371699 A1* | 12/2017 | Gallant ............. G06F 9/45558 |
| 2018/0165166 A1* | 6/2018 | Wang ................... G06F 11/203 |
| 2019/0250997 A1* | 8/2019 | Karasev ............. G06F 9/45558 |
| 2020/0050522 A1* | 2/2020 | Coleman ............. G06F 11/203 |
| 2020/0409806 A1* | 12/2020 | K ....................... G06F 9/45533 |

* cited by examiner

*Primary Examiner* — Jacob D Dascomb
(74) *Attorney, Agent, or Firm* — Fabian VanCott; Steven L. Nichols

(57) ABSTRACT

According to a computer-implemented method, a first virtual machine (VM) is deployed on a first hypervisor from a non-clustered server pool to run a workload of one or more applications. A dummy VM is configured on a second hypervisor from the non-clustered server pool to reserve same resources as the first VM without powering the dummy VM. The first VM is powered with a cold start on the second hypervisor using the resources on the dummy VM. Also, the first VM is provided with a same VM configuration on the second hypervisor that was on the first hypervisor.

14 Claims, 8 Drawing Sheets

VIRTUAL MACHINE DEPLOYMENT

BACKGROUND

In a cloud world, an application may be offered through a virtual machine (VM), which is a software construct that can emulate an entire computing system in which the resources of a host computing system are virtualized or transformed to be the underlying support for the VM. Virtualization works by inserting a thin application program, called a hypervisor, on a host computing system. The hypervisor allocates resources for the VM both dynamically and transparently. The workload of the VM can be moved from one hypervisor to another hypervisor to improve resource utilization of the underlying host computing system.

SUMMARY

According to an embodiment of the present invention, a computer-implemented method is described. According to the computer-implemented method, a first virtual machine (VM) is deployed on a first hypervisor from a non-clustered server pool to run a workload of one or more applications. A dummy VM is configured on a second hypervisor from the non-clustered server pool to reserve same resources as the first VM without powering the dummy VM. The first VM is powered with a cold start on the second hypervisor using the resources on the dummy VM. Also, the first VM is provided with a same VM configuration on the second hypervisor that was on the first hypervisor.

The present specification also describes a computer program product for deploying a first VM. The computer program product includes a computer readable storage medium having program instructions embodied therewith. The program instructions are executable by a processor, to cause the processor to 1) deploy a first VM on a first hypervisor from a non-clustered server pool to run a workload of one or more applications; 2) configure a second VM on a second hypervisor from the non-clustered server pool to be a dummy VM; 3) power with a cold start the first VM on the second hypervisor using resources of the dummy VM; and 4) provide the first VM on the second hypervisor a same VM configuration that was on the first hypervisor so that the first VM is able to run the same workload of one or more applications.

The present specification also describes a system. The system includes a non-transitory memory that stores instructions. A computer processor executes the instructions to perform operations. The operations include deploying a first VM on a first hypervisor from a non-clustered server pool to run a workload of applications. The operations further include assigning a second VM on a second hypervisor from the non-clustered server pool to be a dummy VM that is not to be powered on but that still includes an amount of CPU and RAM. The operations include powering with a cold start the first VM on the second hypervisor using resources of the dummy VM. The operations also include providing the first VM on the second hypervisor a same VM configuration that was on the first hypervisor as determined by a configuration file of the first VM.

DETAILED DESCRIPTION

Figure 1:
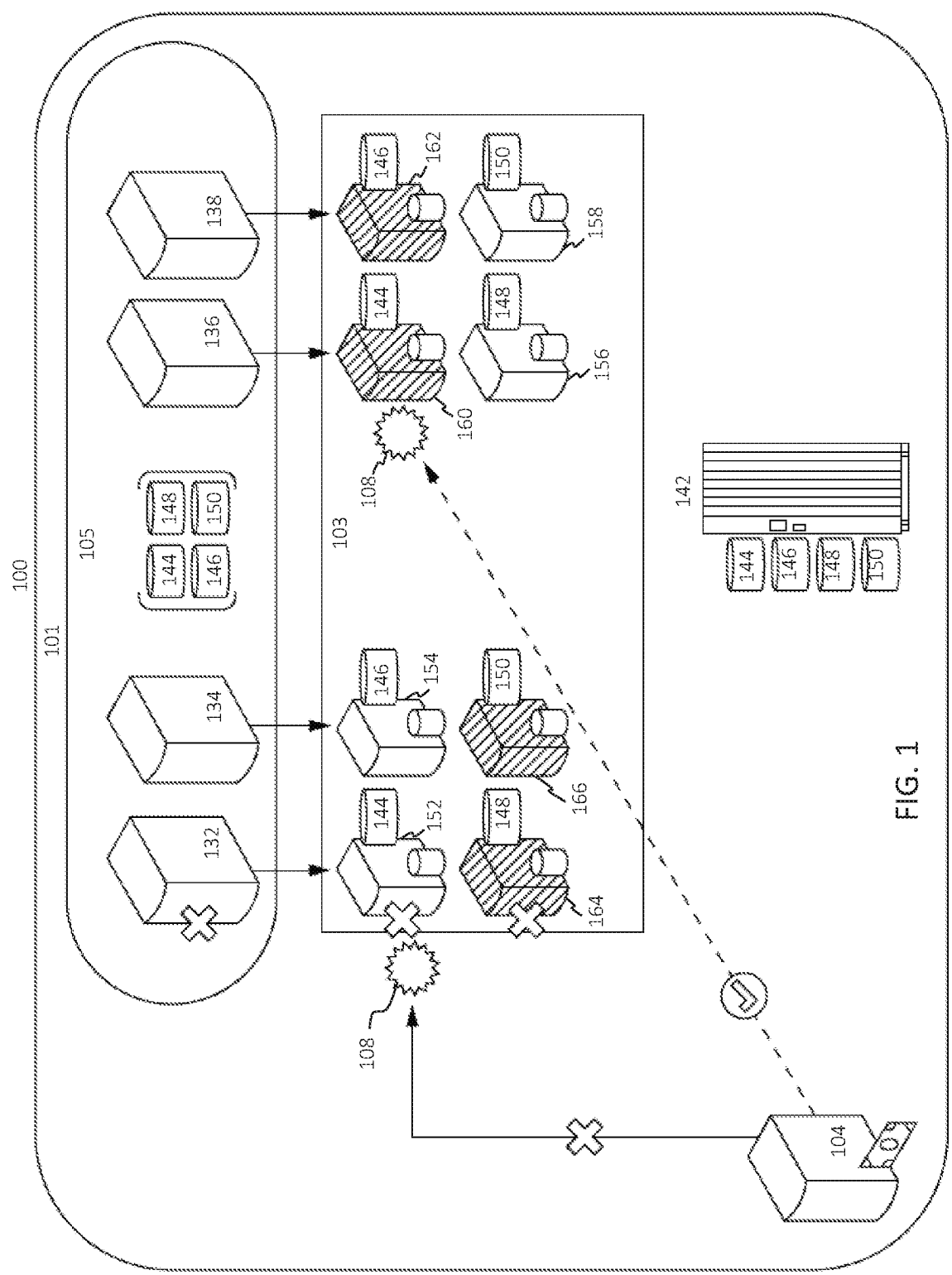
FIG. 1 depicts a computing environment for deploying a dummy virtual machine (VM) according to an example of the principles described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A "high availability" framework as used in the present specification and in the appended claims is one that enables components to be in a running state at all times, or reliably utilized with a minimum amount of down-time. Such a framework further implies that an application cluster is monitored and may automatically restart critical components if they stop unless the restart processing is overridden. The high availability framework also provides alerts to clients when configurations change. This enables clients to immediately react to the changes, enabling application developers to hide outages and reconfigurations from end users. The high availability framework may also provide alerts to clients when configurations change. The scope of a high availability framework may span from the restarting of stopped processes, including some instance background processes, to failing over the processing of an entire instance to other available instances through the relocation of services.

In a cloud world, users generally need the ability to move their workload with the least amount of disruption possible. It is beneficial to have applications, and particularly virtual machines (VMs), have high availability such that components can remain in a running state. For example, when a hypervisor fails, it can be desirable for VMs to continue in a running state. Otherwise, a VM experiences downtime during planned and unplanned maintenance which may cause a disruption of services being provided to a user.

Many applications are simply not developed for deployment on the cloud, requiring ingenuity to take advantage of the cloud as opposed to deploying on a dedicated platform. Current high availability solutions are in need of advanced features for deployment on the cloud. For example, live migration, the process of moving a running VM or application between different physical machines without experiencing downtime, or otherwise disconnecting the client or application, allows a VM to continue running in a seamless or partly seamless manner. Unfortunately, this is not an amenable solution for many environments. For one thing, a VM is often configured to use a much lower number of CPUs than an underlying host can offer. For instance, if the underlying host CPU count is H(CPU)=96 and the VM needs 8 CPUs indicated here as V(CPU)=8, either the VM can be tied to eight specific CPUs of the underlying host or the VM can be configured to use any eight CPUs from the underlying host. The former method is referred to as "hard-partitioning" and the latter is referred to as "soft-partitioning." in "hard-partitioning," an application vendor typically charges licensing fees for actual CPUs attached to the VM, i.e., V(CPU)=8. In "soft-partitioning," the application vendor charges licensing fees for all CPUs of the underlying host, i.e., H(CPU)=96. Each case is unfavorable; hard-partitioning makes the VM incompatible for live migration and soft-partitioning makes the application licensing very costly.

Live migration may involve the VM relying on a clustered server pool that includes multiple interconnected computers, servers (e.g., hypervisors, etc.) or virtualized servers (servers installed with some application that acts like a hypervisor) that appear as if they are one server to end users and applications. This is an expensive solution that relies on a pool file system to monitor the health and availability status of each server within that clustered server pool. In the case of a planned downtime or if a clustered server fails, a VM can be live migrated from one server to another within the clustered server pool and continue running. However, the VM is typically restricted to moving to servers within the clustered pool making this less of a viable option. A VM can only be restarted on one of the limited servers within that clustered server pool. Also, a clustered server pool restricts the number of servers that can be part of the cluster due to the requirement of the pool file system.

Furthermore if the VM is hard partitioned within the clustered server pool, the hardware resources of the VM are assigned to particular hardware and are thus isolated from the other hardware partitions in the server. Such a configuration generally does not support live migration even if the server pool is clustered. It will require a manual intervention to restart the VM on another server in the pool.

A non-clustered server pool is a solution that includes computers or servers that share one or more common repositories with other computers or servers. Repositories store VM configuration files which are shared with all the servers in a non-clustered server pool allowing all the servers in that pool to read and change each VM's configuration files. The non-clustered server pool does not require a pool file system like a clustered server pool, making it a far less expensive solution. If a server fails, VMs on a server can be restarted manually on a different server in the server pool, or possibly on a server in another server pool, if that server pool also has access to the repositories needed for deploying the VMs on the failed server. Live migration is supported between servers in a non-clustered pool if the servers have the same central processing unit (CPU) affinity (i.e., same family and type of CPU). In this manner, a workload can be offloaded to another server.

There are a number of advantages to be realized with the use of a non-clustered server pool over a clustered server pool. For one thing, the number of servers in a non-clustered server pool can be very high, offering more server selections for a VM to be restarted on and without the burdensome overhead of a pool file system in a clustered server pool. Also, an outage of more than one server in a small clustered server pool could quickly flood remaining servers with VMs from the failed servers. Unless manually accounted for, this could lead to over usage and reduced performance of the remaining servers. Since the number of servers in a non-clustered server pool is typically greater than that of a clustered server pool, there is less of a chance of flooding VMs. Also, a method of reserving resources in a dummy VM as discussed herein prevents over usage with guaranteed resource allotment upon VM relocation.

A challenge to using a non-clustered server pool is that if a server fails, VMs on the server must be restarted manually on a different server in the server pool, or possibly on a server in another server pool, if that server pool also has access to the repositories needed for deploying the virtual machines on the failed server. Live migration is supported between servers in a non-clustered pool, but only if the servers have the same central processing unit (CPU) affinity (i.e., same family and type of CPU). Another challenge to using a non-clustered server pool is that even if a VM fails over to another server, that server can quickly get overwhelmed with the workload of the VM. If the server space is kept free to handle the workload, this is an expensive solution as the entire server will be idle for a vast majority of the time.

The following provides a high availability framework in which a workload is moved through the deployment of a VM from one server to another server. More particularly, VMs are assigned to be an active VM or a dummy VM. An active VM actively runs a user workload. A dummy VM is passive, meaning that it does not run on the operating system as a backup VM to support failover of things like applications and data of an active VM. The dummy VM requires no patching, monitoring, and backups, and therefore does not consume a significant amount of resources. While both types of VMs may be assigned the same resources, only the active VM runs an actual workload of the application deployed in it. The dummy VM will never be powered on during its life-time. When a hypervisor for the active VM is shut down, or the active VM itself is shut down, resources from the dummy VM are used to power on the first VM on a different hypervisor. The entire process or parts of the process may be automatic.

Two example computing environments will now be described to discuss possible implementations of VM frameworks which can be used for the deployment process. The first computing environment is a single site environment and the second computing environment is a dual site environment. Turning to FIG. 1, a single site environment 100 is shown in which a single data center 101 includes a plurality of hypervisors 132, 134, 136, 138 that are included in a non-clustered server pool 105.

The data center 101 further includes a plurality of VMs 152, 154, 156, 158, 160, 162, 164, 166 which are outside of the non-clustered server pool 105 and as such remain unaffected in the case of an outage of the hypervisors 132, 134, 136, 138. Downward pointing arrows indicate which VMs are included with which hypervisors. For example, VMs 152 and 164 are included with hypervisor 132, VMs 160 and 156 are included with hypervisor 136, and so forth. VMs 152, 154, 156, 158 are assigned to be active VMs to run the actual workload of the applications deployed in them. Note that each workload of applications to be run on an active VM may be deployed concurrently with the respective active VM as one cohesive bundle that remains intact without the respective hypervisor. For example, the workload of applications to be run by the first VM 152 may be deployed concurrently with the first VM 152 as one cohesive bundle that remains intact without the first hypervisor. CPU cores may be pinned to these VMs as part of hard partitioning which restricts the VMs from being used for live migration.

Each active VM 152, 154, 156, 158 stores its unique properties, such as pinned cores, RAM, names of disks attached to the VM, type of virtualization, and what action should a hypervisor take when the VM fails. This information may be stored in a file, such as a configuration file, that is held in a repository or other shared file system that is multi-mapped, or in other words, mounted on all of the hypervisors 132, 134, 136, 138 in the non-clustered server pool 105. The files can be accessed by any one of the hypervisors 132, 134, 136, 138 in the non-clustered server pool 105. This means that each of the active VMs 152, 154, 156, 158 can be started from any hypervisor in the non-clustered server pool 105 provided that all of the resources required for restarting a VM are present on a selected hypervisor. Typical resources may include, for example, disks and an overlay network required by the VM.

From the same non-clustered server pool 105, a plurality of VMs 160, 162, 164, 166 are assigned to be dummy VMs for respective active VMs 152, 154, 156, 158. Each dummy VM, as indicated by diagonal lines, is located on a different hypervisor than its respective active VM. For example, dummy VM 160 on hypervisor 136 is assigned to active VM 152 on hypervisor 132. In the event that an active VM shuts down on a hypervisor, the VM can be powered on a different hypervisor using resources of the dummy VM. This is made possible because the storage required by the applications running inside each of the VMs 152, 154, 156, 158 is multi-mapped to all of the hypervisors 132, 134, 136, and 138.

As shown, a storage array 142 in the data center 101 provides storage space for the plurality of VMs 152, 154, 156, 158, 160, 162, 164, 166 as well as the hypervisors 132, 134, 136, 138. Storage space is allocated between logical unit numbers (LUNs) or some other form of identification of separate storage volumes within the storage array. LUNs are of the same type, size, and share performance characteristics. They are mapped to the servers in the non-clustered server pool. The four LUNs 144, 146, 148, and 150 as depicted are shared between the plurality of VMs 152, 154, 156, 158, 160, 162, 164, 166 and the hypervisors 132, 134, 136, 138. The storage LUNs 144, 146, 148, 150 may further be marked as non-shareable with each other to prevent them from being simultaneously written by more than one guest operating system.

In operation, virtual network definitions that define an overlay network are created by a VM administrator to provide an overlay network for the VMs 152, 154, 156, 158, 160, 162, 164, 166 to make them operational. The same overlay network is defined on each hypervisor 132, 134, 136, 138.

In FIG. 1, VM 152 is used as an example of an active VM that will be shut down while it is running an application 108 on hypervisor 132 and communicating with a source 104. VM 152 is referred to as the first VM and hypervisor 132 is referred to as the first hypervisor for this example. The source 104 being communicated with may be a physical server, a virtual server, or any other device, inside or outside the single site environment 100 or data center 101, that is able to communicate an application with a VM. The source 104 may further be any application whose functionality depends on the availability of application 108 running in VM 152. For example, the source 104 may be a custom-built application that requires a database application 108. The source 104 may further be a micro-service which requires access to another micro-service 108. Alternatively, the source 104 may be a file transfer client which requires access to file transfer server 108. The source 104 may be a service-oriented architecture (SOA) service which depends on another SOA service 108. The source 104 may also be an encryption work-station which requires access to encryption keys hosted by 108. Other examples are anticipated.

VM 160 is assigned to be a dummy VM or placeholder for first VM 152 on second hypervisor 136. The same number of CPU cores are pinned to the dummy VM 160 as with the first VM 160 to keep the configuration symmetric between the first VM and the dummy VM. The same amount of CPU and RAM is assigned to dummy VM 160 as with the first VM 160 when the first VM 160 is created either manually or through VM provision and orchestration workflow. Same amounts of CPU avoid over allocation of resources on the second hypervisor 136. Dummy VM 160 does not have any disk or virtual network interfaces attached to it. By not attaching any disk or virtual network interface to the dummy VM 160, this ensures that the dummy VM 160 cannot be powered on either deliberately or accidentally. Creating the dummy VM prevents the allocation of the same CPUs to any other VM and thus guarantees resource reservation. This further prevents over-commit of CPU and RAM which would easily occur if the same CPU core was pinned to more than one VM.

During a planned downtime of first hypervisor 132, first VM 152 is shut down. If the first hypervisor 132 goes down, all of the VMs on first hypervisor 132 go down as well. This is indicated in FIG. 1 by first hypervisor 132, first VM 152, and dummy VM 164 all being crossed out. First VM 152 is then powered on with a cold start on a second hypervisor 136 using resources of the dummy VM 160. The same application 108 that was running on the first hypervisor 132 may run on the second hypervisor 136 and communications with the outside server 104 are re-established. Because the configuration file is on a shared file system, typically a network file system (NFS), the configuration file can be accessed from the second hypervisor 136 with ease. Since all of the storage required by a VM is multi-mapped to all of the hypervisors from that server pool, the VM to storage mapping is not broken when the first hypervisor 132 shuts down and the relationship as defined in the VM configuration file persists. This is true for the overlay network, such as the overlay network required by the first VM 152. Once first VM 152 is powered on, first VM 152 comes up on the second hypervisor 136 in the same manner that it would on the first hypervisor 132. The transition from the first hypervisor 132 to the second hypervisor 136 may appear to be seamless such that a user will notice little, if any, difference in the application 108 running. This provides a high availability framework that is desirable in computing environments and which is not currently available.

Note that this framework works the same way when the first VM 152 goes down as part of an unplanned downtime due to a hypervisor fail or other unintended cause, with the first VM 152 being cold started in the same manner on the second hypervisor 136 after the unplanned downtime.

Once the first hypervisor 132 is successfully running, the dummy VM 160 is moved over to the first hypervisor 132. Moving the dummy VM 160 to the first hypervisor 132 when the first hypervisor 132 is restored prevents space and resources of the first hypervisor 132 from being allocated to other VMs that may be created or transferred over to the first hypervisor 132. Furthermore, moving the dummy VM 160 prevents both the dummy VM 160 and the first VM 152 from occupying the second hypervisor 136. A state of sharing the same hypervisor between the dummy VM 160 and the first VM 152 would negate the ability of the first VM 152 to be moved if the second hypervisor 136 shuts down again. In the future, if the first VM 152 on the second hypervisor 136 fails or the second hypervisor 136 fails, the first VM 152 will be restarted on the first hypervisor 132. If the dummy VM 160 is moved to a different hypervisor, then the first VM 152 will be restarted on that hypervisor.

Note that moving the dummy VM 160 to the first hypervisor 132 does not require downtime. If the first VM 152 were to be moved back to its original hypervisor, first hypervisor 132, such action would require downtime.

Examples of storage required by the application running inside the first VM 152 include iSCSI LUNs, fiber channel LUNs, virtual disks, etc. The technical steps to allocate storage to the VMs may change depending on the type of storage being used, however, this does not necessarily affect the general purpose and layout as described herein.

A variation of a single site setup includes symmetrically obtaining LUNs 144, 146, 148 and 150 from two storage area network (SAN) units instead of one SAN unit 142 as depicted. This could provide additional resiliency against failure of SAN unit 142.

Figure 2:
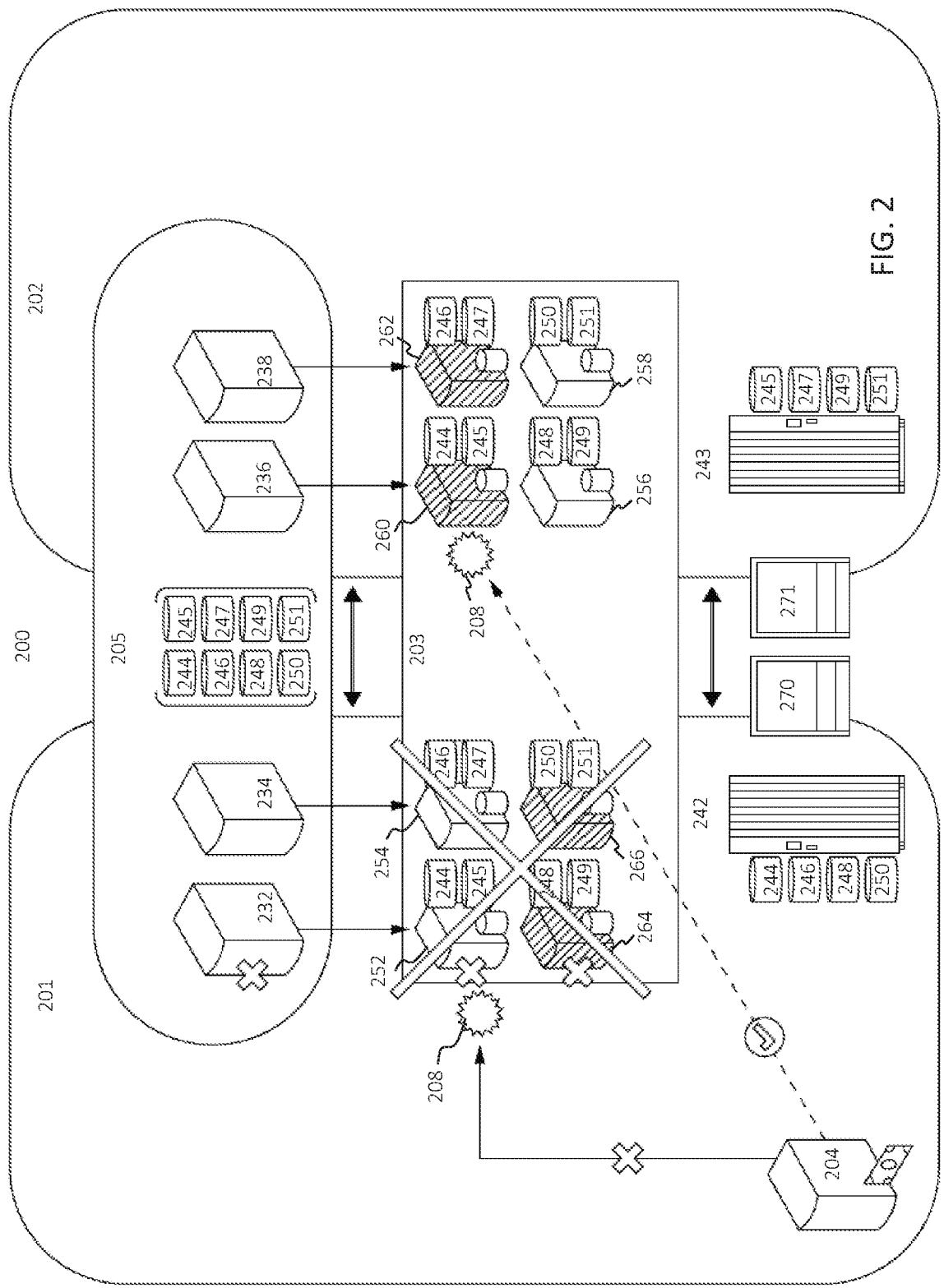
FIG. 2 depicts a computing environment for deploying a dummy VM according to an example of the principles described herein.

The second computing environment will now be described. Turning to FIG. 2, the dual site environment 200 includes a first data center 201 and a second data center 202 that are connected over a network (indicated by horizontal arrows). This connection allows the non-clustered server pool 205 to be shared between first data center 201 and second data center 202. As shown, data, center 201 includes hypervisors 232 and 234 that are connected over a network (indicated by horizontal arrow) to hypervisors 236 and 238 in data center 202 to form a shared non-clustered server pool 205.

Each data center 201 and 202 further includes a respective plurality of VMs 252, 254, 256, 258, and 260, 262, 264, 266 which may be hosted on virtualized servers (not shown) that are outside of the non-clustered server pool 205. VMs 252, 254, 256, 258, are connected over a network (indicated by horizontal arrow) to VMs 260, 264, 266 such that they remain unaffected in the case of an outage on their respective hypervisors. Downward pointing arrows indicate which VMs are included with which hypervisors. For example, VMs 252 and 264 are included with hypervisor 232. VMs 254 and 266 are included with hypervisor 234. VMs 260 and 256 are included with hypervisor 236. VMs 262 and 258 are included with hypervisor 238.

VMs 252, 254, 256, 258 are assigned to be active VMs to run the actual workload of the applications deployed in them. Note that each workload of applications to be run on an active VM may be deployed concurrently with the respective active VM as one cohesive bundle that remains intact without the respective hypervisor. For example, a workload of applications to be run on the first VM 252 may be deployed with the first VM 252 as one cohesive bundle. CPU cores may be pinned to these active VMs as part of hard partitioning which restricts the VMs from being used for live migration to other virtualized servers. Each active VM 252, 254, 256, 258 stores its unique properties, such as pinned cores, RAM, names of disks attached to the VM, type of virtualization, and what action should a hypervisor take when the VM fails. This information may be stored in a file, such as a configuration file, that is stored in a repository or other shared file system that is mounted on all of the hypervisors 232, 234, 236, 238 in the non-clustered server pool 205 and connected over the network. The files can be accessed from any one of the hypervisors 232, 234, 236, 238 in the non-clustered server pool 205. This means that each of the active VMs 252, 254, 256, and 258 can be started from any hypervisor in the non-clustered server pool 205 provided that all of the resources required for restarting an active VM are present on a selected hypervisor. Typical resources may include, for example, disks and an overlay network required by the active VM.

From the same non-clustered server pool 205, a plurality of VMs 260, 262, 264, 266 are assigned to be dummy VMs, as indicated by diagonal lines, for respective active VMs 252, 254, 256, 258. Each dummy VM is located on a different hypervisor than its respective active VM. In the event that an active VM shuts down on a hypervisor, the active VM can be powered on a different hypervisor using resources of its dummy VM. This is made possible because the storage required by the applications running inside each of the VMs 252, 254, 256, 258 is multi-mapped to all of the hypervisors 132, 134, 136, 138 over the network.

Instead of collectively providing storage to each data center from a single storage array, each data center 201 and 202 has a respective storage array 242 and 243 which provides storage space for respective VMs 252, 254, 264, 266, and 260, 262, 256, 258 as well as for respective hypervisors 232, 234, and 236, 238. Storage space is allocated between logical unit numbers (LUNs) or some other form of identification of separate storage volumes within the storage array. Storage array 242 includes four LUNs 244, 246, 248, and 250 which are shared between the plurality of VMs 252, 254, 256, 258, 260, 262, 264, and 266 and hypervisors 232, 234, 236, and 238. Storage array 243 includes four LUNs 245, 247, 249, and 251 which are shared between the plurality of VMs 252, 254, 256, 258, 260, 262, 264, 266 and hypervisors 232, 234, 236, 238.

LUNs are allocated such that each VM includes a LUN from each of the two data centers 201 and 202. For example, first VM 252 includes LUN 244 from SAN 242 and LUN 245 from SAN 243. Dummy VM 260 likewise includes LUN 244 from SAN 242 and LUN 245 from SAN 243. Sharing of storage occurs over a network as indicated by the horizontal arrows. Each data center 201 and 202 includes a storage director switch 270 and 271 that connects the two storage arrays 242 and 243 together and that controls sharing of storage LUNs across data centers 201 and 202.

Under normal conditions, the two storage arrays 242 and 243 are up and can see each other. The host level mirroring or storage level mirroring ensures that data is consistent and available for the LUNs 244, 246, 248, 250, 245, 247, 249, 251 coming from their respective data centers 201 and 202. When one of the two storage arrays 242 and 243 fails, the other storage array continues to provide continued access to the mirrored. LUNs. For example, if storage array 242 fails, the other storage array 243 continues to provide access. In this manner, the primary VM 252 and its dummy VM 260 can access redundant and mirrored storage from their respective hypervisors 232 and 236.

In an embodiment, storage LUNs 244, 246, 248, 250, 245, 247, 249, and 251 may be marked as non-shareable with each other to prevent them from being simultaneously written by more than one guest operating system. In operation, virtual network definitions may be created by the VM administrator to provide an overlay network for the VMs 252, 254, 256, 258, 260, 262, 264, 266 to make them operational. The same overlay network is defined on each hypervisor 232, 234, 236, and 238.

In the present example shown, VM 252 is used as the first VM that will be shut down while it is running an application 208 on hypervisor 232, which will be the first hypervisor. The first VM 252 will also be communicating with an outside server 204 when it is shut down. The outside server 204 may be a physical server, a virtual server, or any other device that is able to communicate an application with a VM.

VM 260 serves as a dummy VM or placeholder for first VM 252 on second hypervisor 236. The second hypervisor 236 is used to restart first VM 252 after first VM 252 shuts down. The same amount of CPU and RAM are assigned to dummy VM 260 as with the first VM 252. Also, the same number of CPU cores are pinned to dummy VM 260 as with the first VM 252 to keep the configuration symmetric between the first VM 252 on the first hypervisor 232 and the second hypervisor 236. Dummy VM 260 does not have any disk or virtual network interfaces attached to it. The reason for creating the dummy VM 260 is to prevent the allocation of the same CPUs to any other VM. This guarantees resource reservation and further prevents over-commit of CPU and RAM which would easily occur if the same CPU core was pinned to more than one VM.

During a planned downtime of first hypervisor 232, first VM 252 is shut down. When the first hypervisor 232 goes down, all of the VMs on the first hypervisor 232 go down as well. This is so indicated in FIG. 2 by hypervisor 232, first VM 252, and dummy VM 264 all being crossed out. First VM 252 is then powered on with a cold start over the network on a second hypervisor 236 and the same application 208 may run on second hypervisor 236 and communications with the outside server 204 are re-established. Once the first hypervisor 232 is successfully running, the dummy VM 264 is moved over to the first hypervisor 232. In the alternative, the dummy VM and second hypervisor may be on the same data site 201.

The configuration file is on a shared file system and can be accessed from the second hypervisor 236 with ease. Since all of the storage required by a VM is multi-mapped to all of the hypervisors from that server pool, the VM to storage mapping on the hypervisors is not broken when a hypervisor shuts down and the relationship as defined in the VM configuration file still persists. This relationship also holds true for the overlay network, such as the overlay network required by the first VM 252. Once first VM 252 is powered on, first VM 252 comes up on the second hypervisor 236 in the same manner that it would on the first hypervisor 232. This provides a high availability framework that is desirable in computing environments and is currently unavailable.

Note that this framework works the same way when the first VM 252 goes down as part of an unplanned downtime due to a hypervisor fail or other unintended cause, with the first VM 252 being cold started on the second hypervisor 136. Also note that the framework is not limited to a dual data site only, but may apply to any number of data sites as desired.

A comparison between the single site and dual site environments shows that both sites have advantages. Using a dummy VM in a dual site environment is advantageous because it provides resiliency against failure for either sites. If the dual site environment is an independent data center such that it has a fault domain, then full resiliency against site failure is provided. This includes resiliency against failure of the hypervisors as well as the storage space. Using a dummy VM in a single site provides resiliency against a hypervisor failure but not against a site failure. The single site may be more advantageous, however, because it is cheaper due to the inter-connectivity requirements. Ultimately, either site provides guaranteed resource reservation and no over commitment of resources on second hypervisor.

Figure 3:
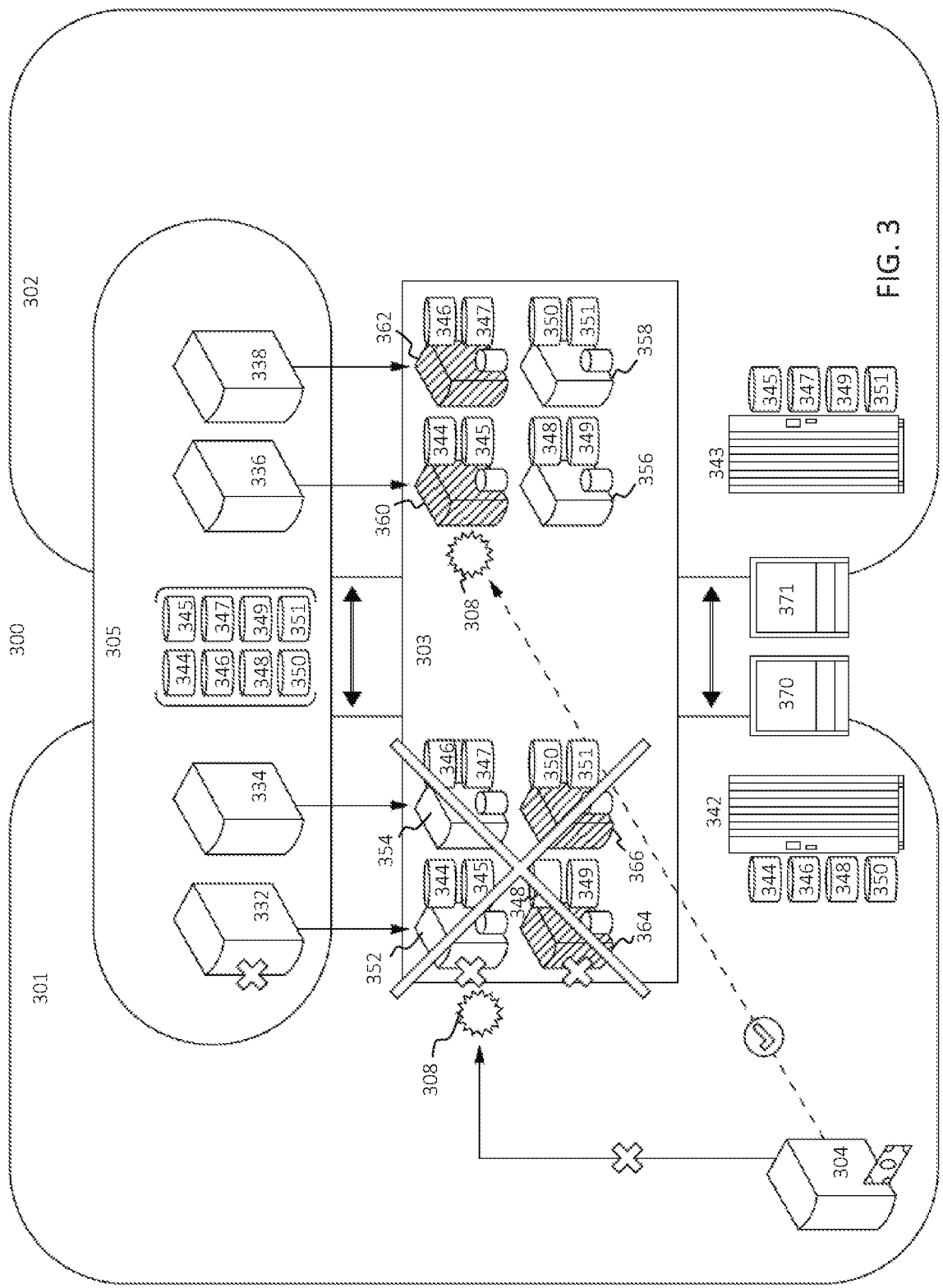
FIG. 3 depicts a computing environment for deploying a dummy VM according to an example of the principles described herein.

Turning to FIG. 3, a variation is shown in which instead of a hypervisor failing or shutting down, one or more VMs fail or are otherwise shut down. As shown, VMs 352, 354, 364, 366 are crossed out indicating a major shut down of all VMs in the first data center 301. With the shutdown, application 308 being communicated with outside server 304 cannot be used in conjunction with first VM 352 on hypervisor 332.

VM 360 in this example serves as a dummy VM to allow first VM 352 to be restarted using resources of dummy VM 360 on hypervisor 336. Application 308 is permitted to continue running on hypervisor 336.

The other active VM on data center 301 is VM 354. Whatever applications are running on active VM 354 will be allowed to run on the resources of dummy VM 362 on hypervisor 338 when active VM 354 uses dummy VM 362 to be restarted on hypervisor 338.

Despite the shutdown, dummy VMs 364 and 366 do not have be moved and there is no loss of service to them. Also, nothing changes from FIG. 2 and FIG. 3 with respect to the storage framework. Each data center 301 and 302 still has a respective storage array 342 and 343 which provides storage space for respective VMs 352, 354, 364, 366, and 360, 362, 356, and 358 as well as for respective hypervisors 332, 334, and 336, 338. Storage array 342 includes four LUNs 344, 346, 348, and 350 which are shared between the plurality of VMs 352, 354, 356, 358, 360, 362, 364, 366 and the hypervisors 332, 334, 336, 338. Storage array 343 includes four LUNs 345, 347, 349, 351 which are shared between the plurality of VMs 352, 354, 356, 358, 360, 362, 364, and 366 and the hypervisors 332, 334, 336, 338. Each data center 301 and 302 includes a storage director switch 370 and 371 which connect the two storage arrays 342 and 343 together over the network (indicated by horizontal arrows). Storage director switch 370 controls sharing of storage LUNs 344, 346, 348, 350 with hypervisors 336 and 338. Storage director switch 371 controls sharing of storage LUNs 345, 347, 349, 351 with hypervisors 332 and 334.

Thus it can be seen that whether or not a single site or a dual site is selected, or whether or not a hypervisor or a VM fails or is otherwise shut down, a dummy VM can be used to restart an active VM on a different hypervisor.

Figure 4:
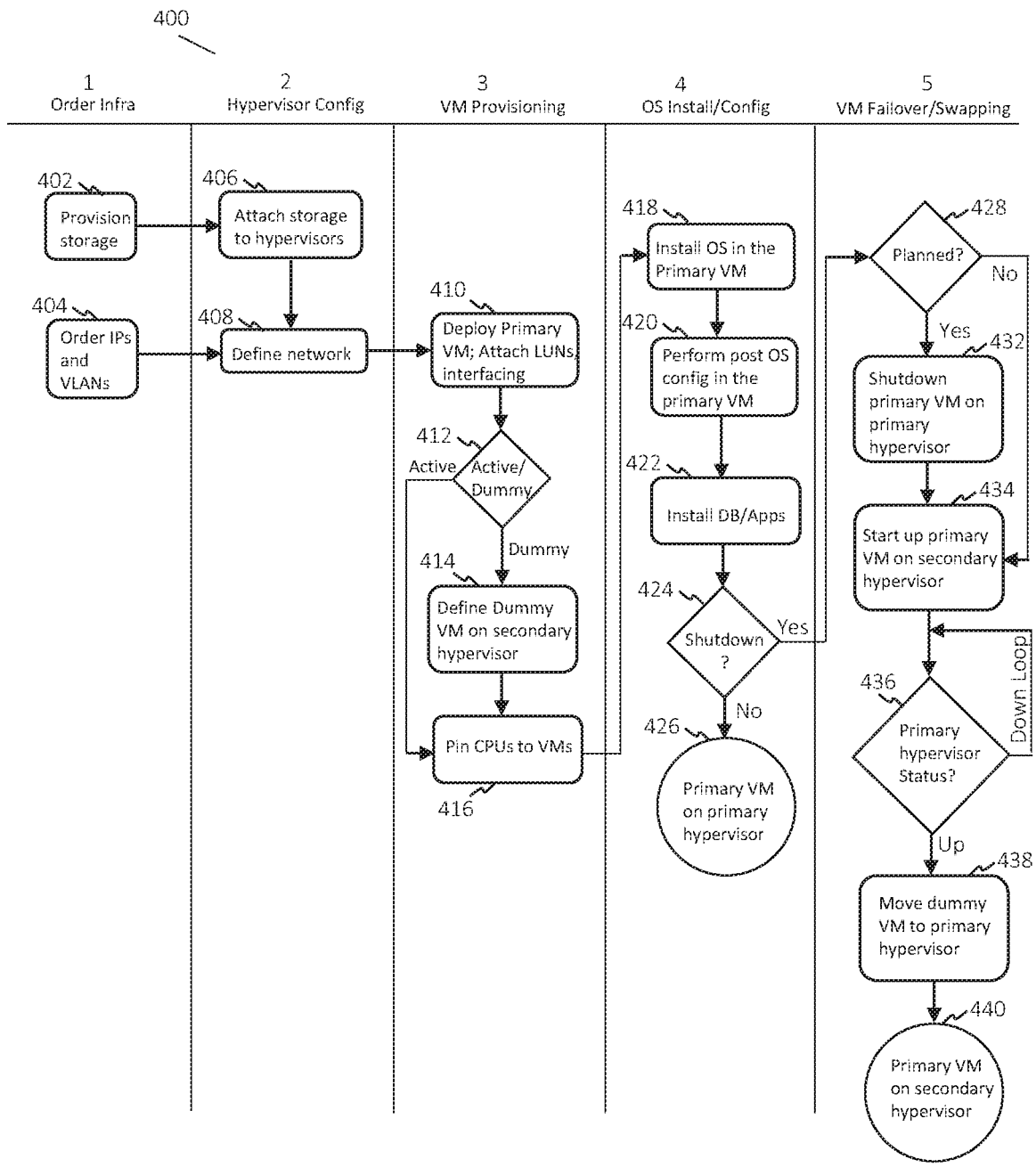
FIG. 4 depicts a flowchart of a method for deploying a dummy VM according to an example of the principles described herein.

Turning to FIG. 4, a flowchart 400 is shown for using a dummy VM according to an example of principles described herein. Reference is made to elements in FIG. 1, however flowchart 400 applies to other Figs. and principles discussed herein.

Working from left to right and up to down, we begin with Order infra 1, which provides example setup information. At block 402, storage is provisioned and multi-mapped to the hypervisors 132, 134, 136, 138 from LUNs 144, 146, 148, 150. At block 404, internet protocol (IP) addresses and virtual local area networks (VLANs) are ordered to establish the single site environment 100 and the various components therein.

Hypervisor Config 2 provides example block information for configuring hypervisors. At block 406, storage is attached to hypervisors 132, 134, 136, 138. Particularly, LUNs 144, 146, 148, 150 are made accessible to the hypervisors 132, 134, 136, and 138, for example, over a network. At block 408, the network for data site 100 is defined. For example, a virtualization administrator may define overlay network settings for one or more hypervisors 132, 134, 136, 138 by creating VLANs interfaces.

VM Provisioning 3 provides example block information for the handling of VMs. At block 410, first VM 152 is deployed and one or more LUNs 144, 146, 148, and 150 are attached to first VM 152. Interfacing, such as interface cards or instance connections may also be attached.

At block 412, it is determined whether or not a VM is assigned to be a dummy VM or an active VM. If a VM is assigned (412) to be a dummy VM, the second hypervisor for the dummy VM is selected at block 414. If a VM is assigned to be an active VM, the second hypervisor is already assigned. For both a VM assigned (412) to be an active VM and a VM assigned to be dummy VM, CPUs are pinned to the active VM or dummy VM at block 416. In the present example, the same amount of CPU and RAM is assigned to dummy VMs 160, 162, 164, 166 as for first VMs 152, 154, 156, 158. First VM 152 is on hypervisor 132 while its dummy VM 160 is on hypervisor 136. First VM 154 is on hypervisor 134 while its dummy VM 162 is on hypervisor 138. First VM 156 is on hypervisor 136 while its dummy VM 164 is on hypervisor 132. First VM 158 is on hypervisor 138 while its dummy VM 166 is on hypervisor 134.

Operating system (OS) install/Config 4 describes OS instructions. At block 418, the OS is installed in the first VM 152. At block 420, post OS is configured in first VM 152. At block 422, a database (DB) and applications (Apps) are installed which have the OS and post OS previously configured in the first VM 152. If there is no shutdown (424) found, the first VM 152 will continue running one or more applications on the first hypervisor 132.

If there is a shutdown, VM Failover/Swapping 5 provides information for a shutdown (424) that is planned or not planned at block 428. If there is a shutdown at block 424, and the shutdown is not planned at block 428, then the first VM 152 will be started up on the second hypervisor 136 using resources on the dummy VM 160 as indicated at block 434.

If there is a shutdown at block 424, and the shutdown is planned as indicated at block 428, then the first VM 152 is purposely shut down on the first hypervisor 132 at block 432, and is then restarted on the second hypervisor 136 using resources on the dummy VM 160 as indicated at block 434.

After the restart of first VM 152 on second hypervisor 136, the first hypervisor 132 is checked at block 436 to determine whether or not it is restored so that it is running as indicated by the Down Loop arrow. Once the first hypervisor 132 is successfully running as indicated by the Up arrow, the dummy VM 160 is moved over to the first hypervisor 132 at block 438. A state of the first VM 152 running on the second hypervisor 132 is indicated by block 440.

Figure 5:
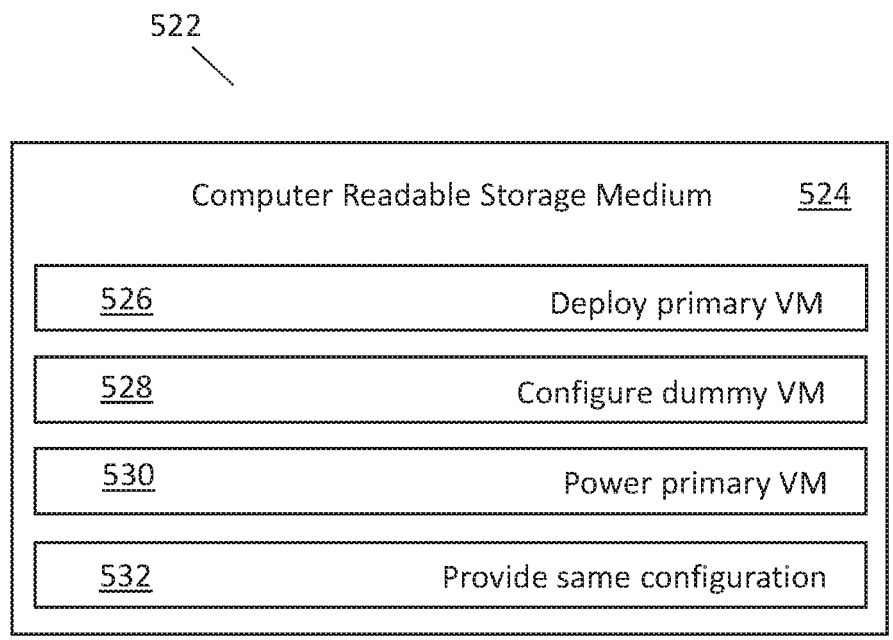
FIG. 5 depicts a computer program product for deploying a dummy VM according to an example of the principles described herein.

FIG. 5 depicts a computer program product 522 with a computer readable storage medium 524 for deploying a first VM on a second hypervisor, according to an example of principles described herein. To achieve its desired functionality, a computing system includes various hardware components. Specifically, a computing system includes a processor and a computer-readable storage medium 524. The computer-readable storage medium 524 is communicatively coupled to the processor. The computer-readable storage medium 524 includes a number of instructions 526, 528, 530, 532 for performing a designated function. The computer-readable storage medium 522 causes the processor to execute the designated function of the instructions 526, 528, 530, 532.

Referring to FIG. 5, deploy first VM 526, when executed by the processor, may cause the processor to deploy a first VM on a first hypervisor from a non-clustered server pool to run a workload of one or more applications. Configure dummy VM 528, when executed by the processor, may cause the processor to configure a second VM on a second hypervisor from the non-clustered server pool to be a dummy VM. Power first VM 530, when executed by the processor, may cause the processor to power with a cold start the first VM on the second hypervisor using resources of the dummy VM. Provide same configuration 532, when executed by the processor, may cause the processor to provide the first VM on the second hypervisor a same VM configuration that was on the first hypervisor so that the first VM is able to run the same workload of one or more applications.

Figure 6:
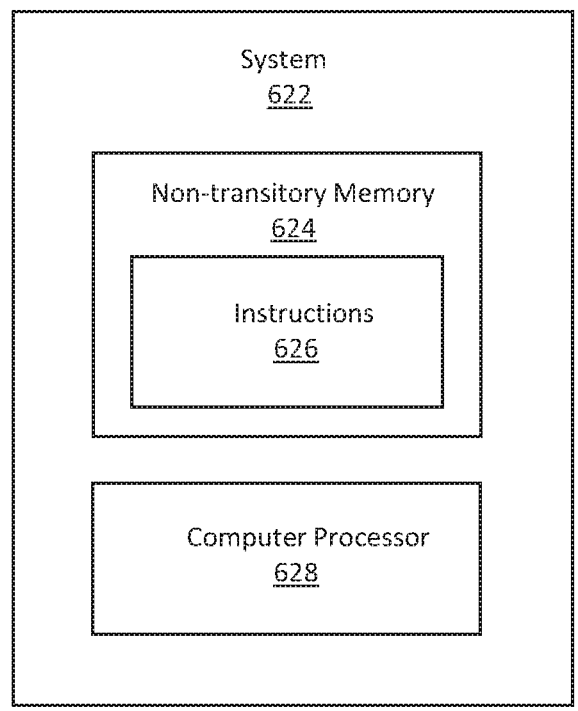
FIG. 6 depicts a system for deploying a dummy VM according to an example of the principles described herein.

It is also contemplated that principles discussed herein be accomplished through a system. Turning to FIG. 6, a block diagram of a system 622 includes a non-transitory memory 624 that stores instructions 626 and a computer processor 628 that executes the instructions 626 to implement the deployment of a first VM on a second hypervisor according to principles discussed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Figure 7:
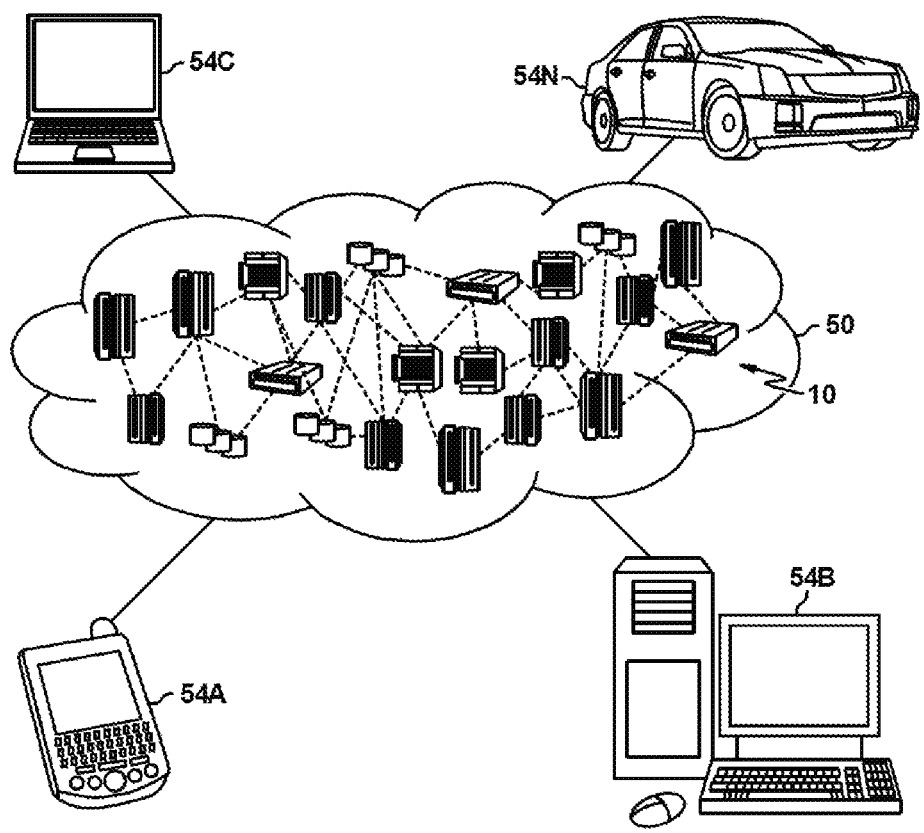
FIG. 7 depicts a cloud computing environment according to an example of the principles described herein.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Closed, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
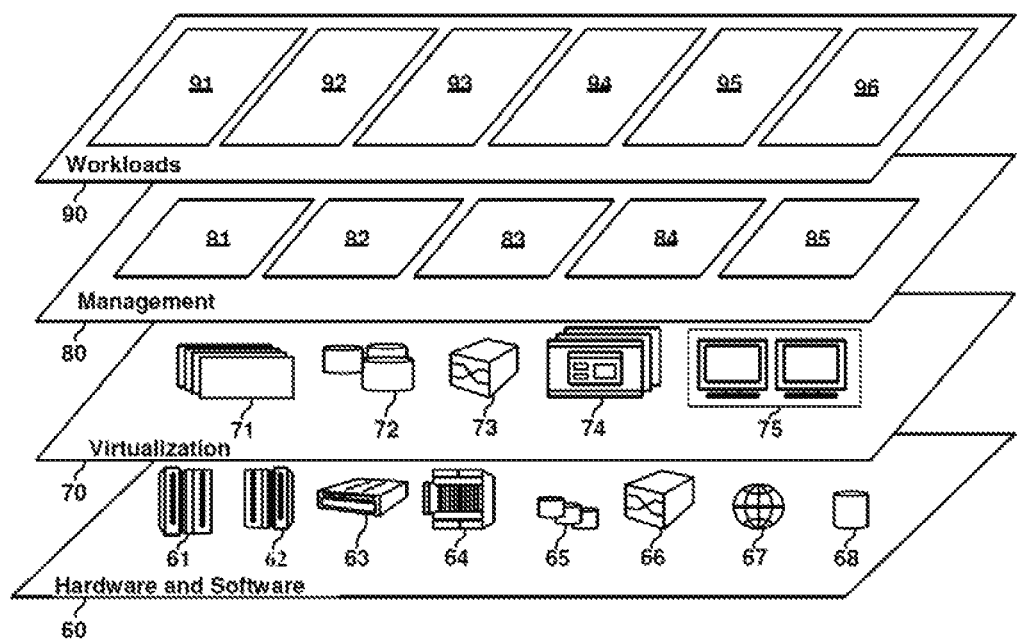
FIG. 8 depicts abstraction model layers according to an example of the principles described herein.

Referring now to FIG. 8, a set of functional abstraction layers provided by cloud computing environment 50 (FIG. 1) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced. Instruction Set Computer) architecture based servers 62; servers 63; blade servers 64; storage devices 65; and networks and networking components 66. In some embodiments, software components include network application server software 67 (that includes in its capabilities one or more implementation aspects of deploying first VMs on second hypervisors using resources on dummy VMs) and database software 68.

Virtualization layer 70 provides an abstraction layer from which the following examples of virtual entities may be provided: virtual servers 71; virtual storage 72; virtual networks 73, including virtual closed networks; virtual applications and operating systems 74; and virtual clients 75, first VMs on second hypervisors using resources on dummy VMs.

In one example, management layer 80 may provide the functions described below. Resource provisioning 81 provides dynamic procurement of computing resources and other resources that are utilized to perform tasks within the cloud computing environment. This may include, for example, allocating storage space as described herein. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for making a virtual machine (VM) high availability, comprising:
   deploying a first VM on a first hypervisor from a non-clustered server pool to run a workload of at least one application;
   configuring a dummy VM on a second hypervisor from the non-clustered server pool, the dummy VM being unattached to any disk or virtual network interface to prevent the dummy VM ever being powered on, the dummy VM to reserve resources equal to those assigned to the first VM without powering the dummy VM;
   powering, with a cold start, a new instance of the first VM on the second hypervisor using the resources assigned to the dummy VM; and
   providing the new instance of the first VM on the second hypervisor with a same VM configuration that was on the first hypervisor.

2. The computer-implemented method of claim 1, wherein the cold start occurs after the first VM is shut down on the first hypervisor due to a downtime or a failure on at least one of the first VM and the first hypervisor.

3. The computer-implemented method of claim 2, wherein the dummy VM is moved over to the first hypervisor after the first hypervisor is successfully running again after the downtime or the failure.

4. The computer-implemented method of claim 1, wherein the cold start is automatically performed and there is little to no disruption in the workload of the at least one application.

5. The computer-implemented method of claim 1, further comprising assigning a same amount of CPU and RAM to the dummy VM as was assigned to the first VM to avoid over allocation of resources on the second hypervisor, the dummy VM to be the dummy VM and not an active VM.

6. The computer-implemented method of claim 1, further comprising pinning a same number of CPU cores to the dummy VM as was assigned to the first VM to keep configurations symmetric between the first VM and the dummy VM.

7. The computer-implemented method of claim 1, wherein a configuration file for the first VM is accessible to both the first and second hypervisors.

8. The computer-implemented method of claim 1, wherein a storage used by the first VM is multi-mapped to at least the first and second hypervisors from the non-clustered server pool.

9. A system, comprising:
   a non-transitory memory that stores instructions;
   a computer processor that executes the instructions to perform operations, the operations comprising:
   deploying a first virtual machine (VM) on a first hypervisor from a non-clustered server pool to run a workload of a number of applications;
   assigning a second VM on a second hypervisor from the non-clustered server pool to be a dummy VM, the dummy VM being unattached to any disk or virtual network interface to prevent the dummy VM ever being powered on deliberately or accidentally, the second VM being assigned an amount of CPU and RAM matching that assigned to the first VM;
   powering with a cold start a new instance of the first VM on the second hypervisor using resources of the dummy VM, wherein storage used by applications running inside the first VM is multi-mapped to both the first and second hypervisors; and
   providing the new instance of first VM on the second hypervisor a same VM configuration that the first VM had on the first hypervisor as determined by a configuration file of the first VM, the same VM configuration comprising a same number of pinned CPU cores, a same amount of assigned CPU and a same amount of assigned RAM, wherein the configuration file of the first VM is stored in a shared storage mounted on and accessible to both the first and second hypervisors;
   wherein a first server supporting the first hypervisor has CPU affinity with a second server supporting the second hypervisor.

10. The system of claim 9, further comprising providing the resources of the dummy VM on the second hypervisor to establish a guaranteed resource reservation.

11. The system of claim 9, wherein the configuration file comprises properties including at least one of names of disks attached to the first VM, a type of virtualization, and actions to be taken when the first VM fails.

12. The system of claim 9, wherein the system comprises two different data centers each comprising a storage director switch that connects two storage arrays respectively in the two data centers and controls sharing of Logical Unit Numbers (LUNs) according the two data centers.

13. The system of claim 9, wherein the cold start occurs after the first VM is shut down on the first hypervisor due to a downtime or a failure on at least one of the first VM and the first hypervisor.

14. The system of claim 13, wherein the dummy VM is moved over to the first hypervisor after the first hypervisor is successfully running again after the downtime or the failure.

* * * * *